E. THOMSON.
ELECTRIC METAL WORKING MACHINE.
APPLICATION FILED MAR. 4, 1911.

1,045,911.

Patented Dec. 3, 1912.

WITNESSES

INVENTOR
ELIHU THOMSON

BY

ATTORNEYS

UNITED STATES PATENT OFFICE.

ELIHU THOMSON, OF SWAMPSCOTT, MASSACHUSETTS, ASSIGNOR TO THOMSON ELECTRIC WELDING COMPANY, OF LYNN, MASSACHUSETTS, A CORPORATION OF MASSACHUSETTS.

ELECTRIC METAL-WORKING MACHINE.

1,045,911. Specification of Letters Patent. Patented Dec. 3, 1912.

Application filed March 4, 1911. Serial No. 612,243.

*To all whom it may concern:*

Be it known that I, ELIHU THOMSON, a citizen of the United States, and a resident of Swampscott, in the county of Essex and State of Massachusetts, have invented certain new and useful Improvements in Electric Metal-Working Machines, of which the following is a specification.

My invention relates to that part of an electric metal working apparatus by which the work is clamped or held in position and is supplied with heating electric current.

My invention provides improved means for doing accurate work and its object is, generally stated, to rigidly secure the pieces for electric welding or other operation in the greatest possible exactness of position and at the same time provide for the supply of current thereto by means of a good conducting metal like copper.

In electric welding machines as ordinarily constructed the work is clamped rigidly in blocks or jaws which are usually made of soft copper or other good conducting material and which jaws form the terminals of the source of heating current and supply current to the work. By reason of the nature of this conducting material, it is liable to get out of shape on account of the heavy pressure of the work when rigidly clamped thereon. This difficulty is increased by reason of the fact that the block is locally heated by the passage of the current, so that the part supporting the metal to be welded softens and is more liable to become deformed by the pressure of the work thereon.

The object of my invention is to avoid this difficulty, and while permitting the electric current to be fed into the work as close as is desired in the portion thereof which is to be locally heated for the welding or other operation, to permit the work to be rigidly and firmly held or clamped in blocks or supports of hard metal, not subject to deformation and properly mounted to maintain the alinement of the work on a rigid bed.

To these ends my invention consists in the novel constructions and combinations of work clamping and current supplying devices hereinafter more particularly described and then specified in the claims.

Some forms in which my invention may be realized are shown in the accompanying drawings, in which—

Figure 1:
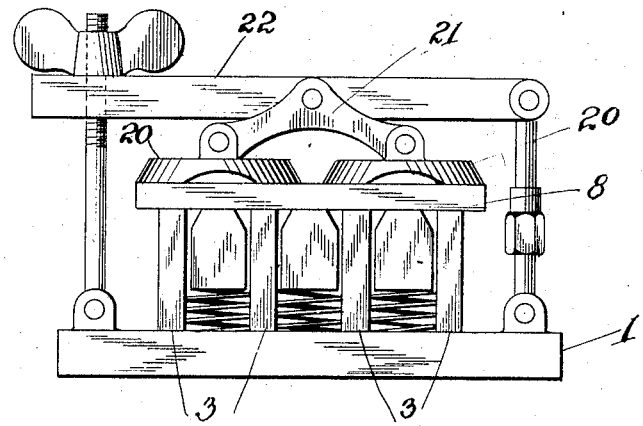
Figure 2:
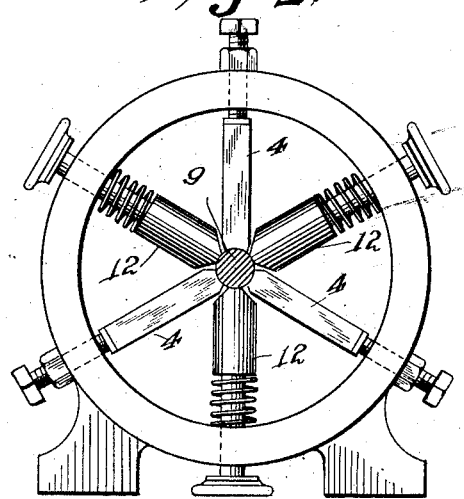

Figure 1 is a general end elevation of one form of the apparatus. Fig. 2 is an end elevation of a modification and Fig. 3 is a side elevation of the same.

The drawing Fig. 1 shows the invention embodied in an apparatus particularly adapted to the holding of a plate of metal rigidly or accurately in position and the supplying of current thereto in accordance with my invention. The plate 8 is shown end on or in the direction or line of the pressure which is applied in the usual or proper way to the heated section of work to effect the welding or other operation. The work support comprises any desired number of support pieces 3 which, as before, are made of steel or other suitable hard metal and these are properly mounted on the bed 1, as already described. The clamping devices comprise by preference clamping jaws 20 pivotally mounted as shown on the ends of an equalizing lever 21 which is itself pivoted on the lever 22, the latter affording means for applying pressure through the fulcrum of the equalizing lever 21 to the pivotally mounted clamping jaws 20. The latter being arranged in line transversely to the work, it will be obvious that an equalization of pressure from lever 22 will occur across the whole extent of the plate 8 to which it is desired to apply the pressure for holding the same rigidly down upon its support. Between the pieces 3—3—3—3 and substantially in the plane of the clamping pressure are copper blocks attached to one of the terminals of a welding transformer secondary, and these blocks are held upward toward the plate 8 to a limited range by powerful springs under them. Another piece to be welded to plate 8 would be held in the same way and one of the holding arrangements would be, of course, movable so as to press the parts up together and forming the weld. It will thus be seen that the current is carried into the work piece by the blocks 11—11 while the support in the accurate position is secured by the pieces 3—3—3—3 upon which the work actually rests.

As will be seen the functions of current conduction and support are separated in the structure while such supports are made of firm hard material, like steel, not easily subject to deformation. It will further be seen that as the blocks or electrodes engage the work at a portion thereof not directly engaged by the rigid clamping devices and are in a sense independent of the same, they will not themselves be subject to the deforming action of the rigid clamps, while nevertheless they will efficiently supply the heating current to the work, in the general plane of the clamping pressure, and therefore as close up to the section to be heated as the rigid clamping devices themselves. Yet, as will be seen, the operation of clamping the work by the rigid clamping devices produces a good and firm contact of the current supplying electrode with the work.

Figure 3:
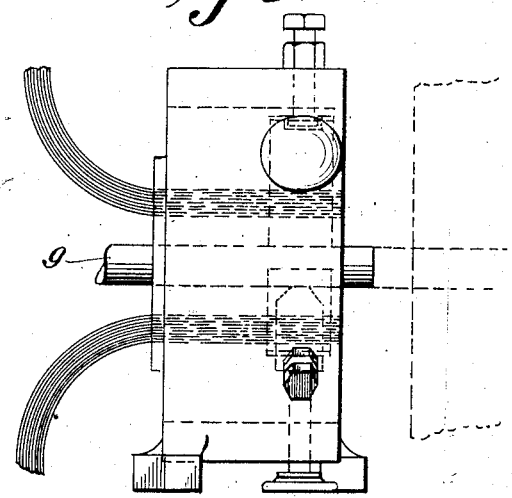

Figs. 2 and 3 show how the same principle may be applied to a concentric chuck where the jaws 4—4—4 are of steel or hard metal and arranged to be adjusted to hold the work piece which is a bar, shown on end, marked 9, accurately. Between these jaws 4—4—4 which may be drawn with great force and accurate placing upon the work piece 9, are other jaws 12—12—12 pressed down upon the bar 9 and contacting electrically with the same, such jaws being made of metal of high conductivity, like copper, and being connected by large section conductors to the welding transformer, all of these jaws or conducting blocks 12—12—12 being, of course, connected to one terminal while a similar structure accurately placed on a bed with relation to this structure would be attached to the other terminal. As will be seen, the current supplying jaws or electrodes 12 make contact with the work substantially in the plane of the clamping pressure but are independent of the rigid clamping devices in the sense that they are not subjected to the deforming action of the same in firmly clamping the work against deviation from alinement.

What I claim as my invention is:

1. In an electric metal working apparatus, the combination of a work holder provided with clamping devices for rigidly holding the work in position thereon and an independent current supplying electrode held against the work in the general plane of the clamping pressure by engaging the work at a portion thereof not engaged by the rigid work holding device.

2. In an electric metal working apparatus, the combination of an equalizing lever having means for applying pressure through its fulcrum and clamping jaws pivotally mounted thereon at opposite sides of the fulcrum.

3. In a work holder for electric metal working apparatus, a support piece of hard metal, means for clamping the work rigidly against the same and a supplemental spring seated current supplying block of soft metal arranged in the line of and receiving the clamping pressure.

4. In a work holder for electric metal working apparatus, two or more support pieces of hard metal combined with an intermediate current supplying piece consisting of soft metal arranged in the general plane of clamping pressure.

5. In a work holder for electric metal working apparatus, two or more rigid support pieces of hard metal combined with an intermediate spring seated current supplying piece of soft metal arranged in the general plane of clamping pressure.

Signed at Lynn in the county of Essex and State of Massachusetts this first day of March A. D. 1911.

ELIHU THOMSON.

Witnesses:
JOHN A. McMANUS, Jr.,
CHARLES A. BARNARD.